(12) United States Patent
Takano et al.

(10) Patent No.: US 6,244,060 B1
(45) Date of Patent: Jun. 12, 2001

(54) REFRIGERATION CYCLE FOR VEHICLE AIR CONDITIONER

(75) Inventors: Yoshiaki Takano, Kosai; Satoshi Izawa; Hajime Ito, both of Kariya, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/613,024

(22) Filed: Jul. 10, 2000

(30) Foreign Application Priority Data

Jul. 30, 1999 (JP) .................................................. 11-217900

(51) Int. Cl.[7] ..................................................... F25B 41/00
(52) U.S. Cl. .......................................... 62/196.4; 62/324.6
(58) Field of Search ................................... 62/196.4, 197, 62/324.6, 244, 527, 528

(56) References Cited

U.S. PATENT DOCUMENTS

| | | | |
|---|---|---|---|
| 4,025,041 | * 5/1977 | Tyler | ...................................... 236/90 |
| 4,136,528 | * 1/1979 | Vogel et al. | ........................ 62/196.4 |
| 5,291,941 | * 3/1994 | Enomoto et al. | ...................... 165/62 |
| 5,477,700 | * 12/1995 | Lio | ...................................... 62/196.4 |

* cited by examiner

*Primary Examiner*—Michael Powell Buiz
*Assistant Examiner*—Mohammad M Ali
(74) *Attorney, Agent, or Firm*—Harness, Dickey & Pierce, PLC

(57) ABSTRACT

A refrigeration cycle for a vehicle air conditioner has a bypass passage between a compressor and an evaporator. In a heating mode, high-temperature gas refrigerant discharged from the compressor is directly introduced into the evaporator through the bypass passage while bypassing a condenser to improve a heating performance of the air conditioner. When a refrigerant recovery mode in which refrigerant staying in the condenser is forced to be discharged and introduced into the evaporator is set, a passage between the condenser and the evaporator in which a thermostatic expansion valve is disposed is controlled to be opened a predetermined amount. As a result, refrigerant staying in the condenser is securely returned to the evaporator even when a temperature of outside air is extremely low and the expansion valve is closed.

12 Claims, 7 Drawing Sheets

REFRIGERATION CYCLE FOR VEHICLE AIR CONDITIONER

CROSS REFERENCE TO RELATED APPLICATIONS

This application relates to and claims priority from Japanese Patent Application No. 11-217900 filed on Jul. 30, 1999, the contents of which are hereby incorporated by reference.

BACKGROUND OF THE INVENTION

1. Field of the Invention

The present invention relates generally to refrigeration cycles, and particularly to a refrigeration cycle for a vehicle air conditioner in which high-temperature gas refrigerant discharged from a compressor is directly introduced into an evaporator. The evaporator functions as a radiator for radiating heat of the gas refrigerant to improve heating performance of the air conditioner.

2. Related Art

Conventionally, when a vehicle air conditioner is operated in a heating mode in winter, high-temperature engine coolant for cooling an engine of a vehicle flows through a heating heat exchanger. The heat exchanger performs heat exchange between air and engine coolant so that air is heated. However, when a temperature of engine coolant is relatively low, air passing through the heat exchanger may insufficiently heated and a temperature of air blown into a passenger compartment of the vehicle may be lowered. Thus, heating performance of the air conditioner may be declined.

JP-A-5-272817 discloses a refrigeration cycle for a vehicle air conditioner. In the refrigeration cycle, when a temperature of engine coolant is relatively low at a time of starting the engine, high-temperature gas refrigerant discharged from a compressor directly introduced into an evaporator through a bypass passage while bypassing a condenser. The evaporator radiates heat of gas refrigerant toward air to heat air.

Further, excess or shortage of an amount of refrigerant circulating through the cycle is detected according to a cycle high pressure of refrigerant detected in the vicinity of an outlet of the compressor. When the amount of refrigerant circulating through the cycle is judged excessive, refrigerant is supplied to the condenser. When the amount of refrigerant circulating through the cycle is judged insufficient, refrigerant staying in the condenser is forced to be discharged and introduced to the evaporator. Refrigerant staying in the condenser is returned to the evaporator by operating the compressor while an inlet of the condenser is opened and an inlet of the bypass passage is closed, that is, in a normal cooling mode.

Generally, a separator which separates gas-liquid two-phase refrigerant into gas refrigerant and liquid refrigerant and stores liquid refrigerant therein is connected to an outlet of the condenser. In the cooling mode, high-pressure liquid refrigerant discharged from the separator is decompressed by a thermostatic expansion valve, and low-pressure refrigerant decompressed by the expansion valve is evaporated by the evaporator. An opening degree of the expansion valve is adjusted so that refrigerant discharged from the evaporator has a predetermined degree of superheat such as 10° C., under normal operation conditions in the cooling mode such as a cycle low pressure is set to 2–5 kg/cm$^2$G.

However, when outside air has an extremely low temperature such as −10° C. or lower, since a temperature sensor of the expansion valve also has a temperature substantially the same as a temperature of outside air at a time of starting a heating mode, a pressure of refrigerant in the temperature sensor is decreased to an extremely low value in comparison with that in the cooling mode. As a result, an opening degree of the expansion valve becomes small, and the expansion valve may be eventually closed when the temperature of outside air is further decreased. Therefore, even when refrigerant staying in the condenser is forced to be returned to the evaporator, refrigerant may not be sufficiently returned to the evaporator.

SUMMARY OF THE INVENTION

In view of the foregoing problems, it is an object of the present invention to provide a refrigeration cycle in which refrigerant staying in a condenser is forced to be returned to an evaporator even when a temperature of outside air is extremely low.

According to the present invention, a refrigeration cycle through which a refrigerant flows has a compressor which compresses the refrigerant and discharges a gas refrigerant, a condenser which condenses the gas refrigerant discharged from the compressor, a decompressing unit which decompresses the refrigerant condensed by the condenser, an evaporator which evaporates the refrigerant decompressed by the decompressing unit, a bypass passage which directly connects an outlet of the compressor to an inlet of the evaporator. The gas refrigerant discharged from the compressor is directly introduced into the evaporator through the bypass passage in a heating mode. The decompressing unit is disposed in a passage between the condenser and the evaporator. The passage between the condenser and the evaporator is opened a predetermined amount when a refrigerant recovery mode in which the refrigerant staying in the condenser is forced to be discharged and introduced into the evaporator is set.

As a result, communication between the condenser and the evaporator is secured during the refrigerant recovery mode, and refrigerant staying in the condenser is securely returned to the evaporator even when a temperature of outside air is extremely low.

Preferably, the decompressing unit is a thermostatic expansion valve including a temperature detector which detects a temperature of the refrigerant discharged from the evaporator. The thermostatic expansion valve is opened until a temperature of the refrigerant discharged from the evaporator detected by the temperature detector is decreased −30° C. and lower.

BRIEF DESCRIPTION OF THE DRAWINGS

This and other objects and features of the present invention will become more readily apparent from a better understanding of the preferred embodiments described below with reference to the accompanying drawings, in which.

DETAILED DESCRIPTION OF THE PREFERRED EMBODIMENTS

Preferred embodiments of the present invention are described hereinafter with reference to the accompanying drawings.

(First Embodiment)

Figure 1:
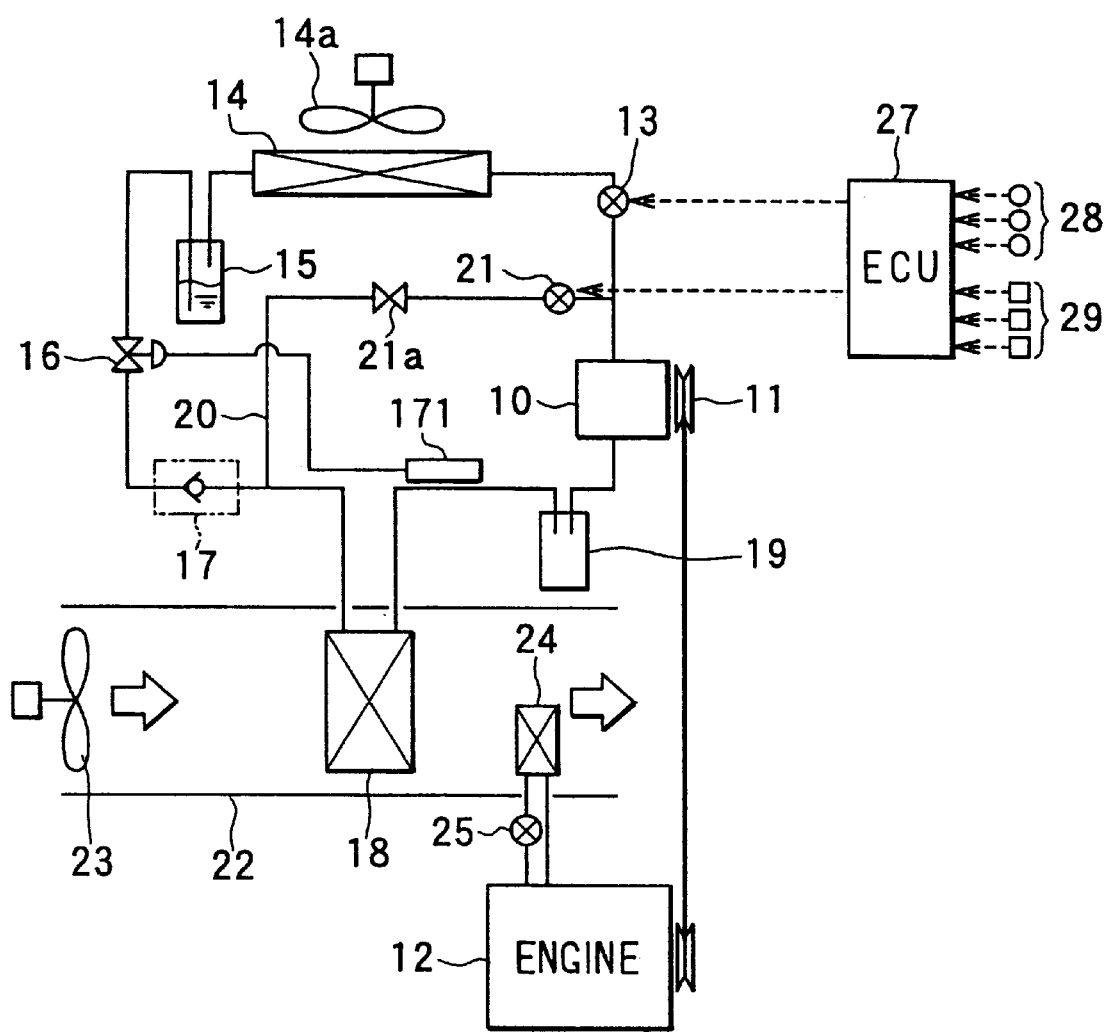
FIG. 1 is a schematic diagram showing a refrigeration cycle for a vehicle air conditioner according to a first preferred embodiment of the present invention.
Figure 2:
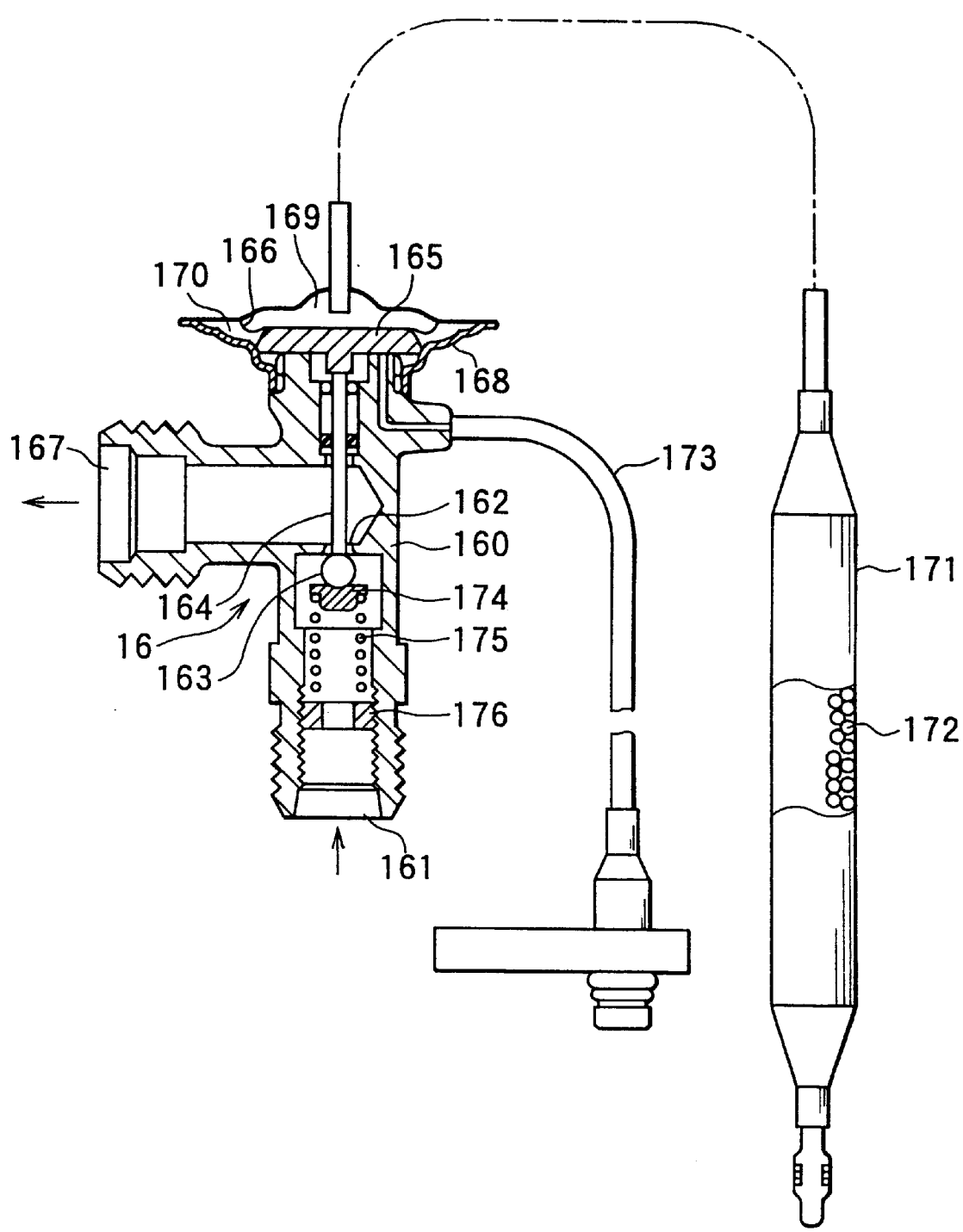
FIG. 2 is a partially sectional view showing a thermostatic expansion valve according to the first embodiment.
Figure 3:
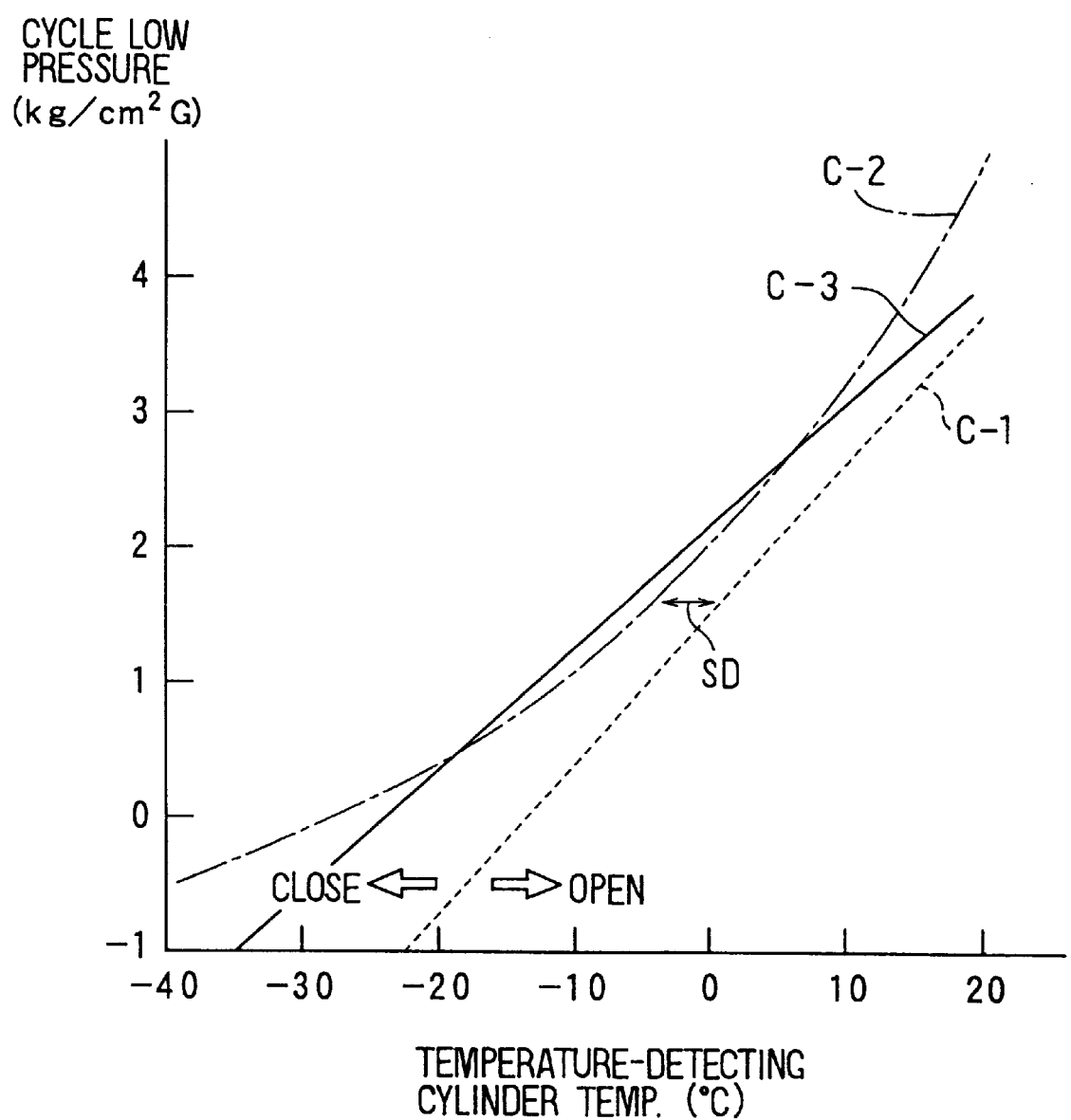
FIG. 3 is a graph showing a relationship between a temperature of a temperature detecting cylinder and a cycle low pressure of the refrigeration cycle according to the first embodiment.

A first preferred embodiment of the present invention will be described with reference to FIGS. 1–3. In the first embodiment, the present invention is applied to a refrigeration cycle for a vehicle air conditioner. As shown in FIG. 1, a compressor 10 of the refrigeration cycle is driven by a water-cooled engine 12 of a vehicle through an electromagnetic clutch 11. An outlet of the compressor 10 is connected to a condenser 14 through a cooling first electromagnetic valve 13. An outlet of the condenser 14 is connected to a separator 15 which separates gas-liquid two-phase refrigerant into gas refrigerant and liquid refrigerant and stores liquid refrigerant therein. An electric cooling fan 14a blows air outside a passenger compartment of the vehicle (hereinafter referred to as outside air) toward the condenser 14 for cooling.

An outlet of the separator 15 is connected to a cooling thermostatic expansion valve 16. An outlet of the expansion valve 16 is connected to an inlet of an evaporator 18 through a check valve 17. An outlet of the evaporator 18 is connected to an inlet of the compressor 10 through a separator 19. As well known, an opening degree of the expansion valve 16 is adjusted so that a degree of superheat of refrigerant discharged from the evaporator 18 becomes a predetermined value in a normal cooling mode. The separator 19 separates gas-liquid two-phase refrigerant into gas refrigerant and liquid refrigerant and stores liquid refrigerant therein. The compressor 10 sucks gas refrigerant and a relatively small amount of liquid refrigerant in which oil is dissolved from the separator 19.

Further, a bypass passage 20 is formed between the outlet of the compressor 10 and the inlet of the evaporator 18. Refrigerant discharged from the compressor 10 flows through the bypass passage 20 into the evaporator 18 while bypassing the condenser 14. A heating second electromagnetic valve 21 and a heating throttle 21a are disposed in the bypass passage 20. The throttle 21a is a fixed throttle such as an orifice or a capillary tube.

The evaporator 18 is disposed in an air-conditioning case 22 to cool outside air or air inside the passenger compartment (hereinafter referred to as inside air) blown by an electric blower 23 in the cooling mode or cooling/dehumidifying mode. In the heating mode in winter, high-temperature gas refrigerant discharged from the compressor 10 is introduced into the evaporator 18 through the bypass passage 20. As a result, the evaporator 18 radiates heat of the refrigerant toward air flowing through the case 22 to heat air. Thus, the evaporator 18 functions as a radiator.

In the case 22, a heating heat exchanger 24 is also disposed at a downstream air side of the evaporator 18. Engine coolant discharged from the engine 12 flows into the heating heat exchanger 24. The heating heat exchanger 24 performs heat exchange between engine coolant and air passing therethrough so that air is heated. The heated air is blown into the passenger compartment from an air outlet (not shown) formed in the case 22 at a downstream air side of the heating heat exchanger 24. A hot water valve 25 is disposed in a hot water circuit connected to the heating heat exchanger 24 for controlling a flow rate of engine coolant in the hot water circuit.

Further, the air conditioner has an electronic control unit (ECU) 27 consisting of a micro-computer and peripheral circuits. The ECU 27 executes calculations on input signals according to previously set programs to control the first and second electromagnetic valves 13, 21, the electromagnetic clutch 11, the cooling fan 14a, the blower 23, the hot water valve 25 and so on. Various signals from a sensor group 28 are input to the ECU 27. The sensor group 28 includes an engine coolant temperature sensor for detecting a temperature of engine coolant, an outside air temperature sensor for detecting a temperature of outside air, an inside air temperature sensor for detecting a temperature of inside air and an evaporator air temperature sensor for detecting a temperature of air having passed through the evaporator 18 and so on. Various signals from an operation switch group 29 disposed on an operation panel of the air conditioner are also input to the ECU 27. The operation switch group 29 includes a cooling mode setting switch, a heating mode setting switch and so on.

Next, the expansion valve 16 will be described in detail with reference to FIG. 2. As shown in FIG. 2, the expansion valve 16 has a case 160 made of metal such as aluminum. The case 160 has an inlet 161 through which liquid refrigerant from the separator 15 is introduced. The inlet 161 communicates with a throttle passage 162 formed in the case 160. An opening degree of the throttle passage 162 is adjusted by a spherical valve body 163. When a diaphragm 166 is displaced through a valve rod 164 and a stopper 165, the valve body 163 is moved, thereby adjusting an opening degree of the throttle passage 162. Refrigerant is decompressed while flowing through the throttle passage 162 and becomes low-temperature low-pressure gas-liquid two-phase refrigerant. The low-temperature low-pressure gas-liquid two-phase refrigerant is discharged from an outlet 167 of the case 160 and flows into the inlet of the evaporator 18 through the check valve 17.

The diaphragm 166 is held and fastened to a diaphragm case 168. An inside of the diaphragm case 168 is partitioned into an upper room 169 and a lower room 170 by the diaphragm 166. The upper room 169 communicates with a temperature detecting cylinder 171 which detects a temperature of refrigerant discharged from the evaporator 18. The temperature detecting cylinder 171 is formed into a cylinder and is made of metal having a relatively high heat conductivity such as copper. The temperature detecting cylinder 171 is attached to a surface of a refrigerant pipe adjacent to the outlet of the evaporator 18.

The upper room 169 and the temperature detecting cylinder 171 are constantly filled with a gas refrigerant. The gas refrigerant contained in the upper room 169 and the temperature detecting cylinder 171 is different from a refrigerant circulating through the refrigeration cycle. In the first embodiment, hydrofluorocarbon 134a (HFC134a) is used as a refrigerant circulating through the cycle, and HFC23 is used as a refrigerant contained in the upper room 169 and the temperature detecting cylinder 171.

An adsorbent 172 which adsorbs or releases gas refrigerant according to a temperature thereof is sealed in the temperature detecting cylinder 171. The adsorbent 172 is made of granular activated carbon, for example. When a temperature of the adsorbent 172 is increased, the adsorbent 172 releases gas refrigerant adsorbed therein. When a temperature of the adsorbent 172 is decreased, the adsorbent 172 adsorbs gas refrigerant. Therefore, a pressure of gas refrigerant in the temperature detecting cylinder 171 changes according to a temperature of refrigerant discharged from the evaporator 18.

A temperature of the adsorbent 172 is delayed to change in a response to a change in a temperature of gas refrigerant in the temperature detecting cylinder 171 due to a heat capacity of the adsorbent 172. Therefore, a pressure of gas refrigerant in the temperature detecting cylinder 171 is also delayed to change in a response to a change in a temperature of refrigerant discharged from the evaporator 18. As a result, hunting of the expansion valve 16 is prevented. Further, an outer equalizing pipe 173 is connected to the lower room 170. A pressure of refrigerant discharged from the evaporator 18 is introduced into the lower room 170 through the outer equalizing pipe 173.

The valve body 163 is held by a valve receiver 174 so that a coil spring 175 applies force to the valve body 163. The coil spring 175 is held by an annular adjusting screw 176. The adjusting screw 176 is screwed in a screw hole formed in the case 160. Therefore, a mounting load of the spring coil 175 is adjusted by adjusting a tightening position of the adjusting screw 176. As a result, a degree of superheat of refrigerant discharged from the evaporator 180 is adjusted.

Next, operation of the refrigeration cycle according to the first embodiment will be described with reference to FIG. 1. In the cooling mode, the first electromagnetic valve 13 is opened and the second electromagnetic valve 21 is closed by the ECU 27. Therefore, when the electromagnetic clutch 11 connects the engine 12 to the compressor 10 so that the compressor 10 is driven by the engine 12, gas refrigerant discharged from the compressor 10 flows into the condenser 14 through the first electromagnetic valve 13. The condenser 14 cools and condenses refrigerant by air blown by the cooling fan 14a. The refrigerant condensed by the condenser 14 is separated by the separator 15 into gas refrigerant and liquid refrigerant, and only liquid refrigerant is decompressed by the expansion valve 16 to become low-temperature low-pressure gas-liquid two-phase refrigerant.

Next, the low-temperature low-pressure refrigerant flows into the evaporator 18 through the check valve 17 to be evaporated while absorbing heat from air blown by the blower 23. As a result, air is cooled by the evaporator 18 and is blown into the passenger compartment for cooling the passenger compartment. Refrigerant evaporated by the evaporator 18 becomes gas refrigerant and is sucked by the compressor 10 through the separator 19 to be compressed therein.

In the heating mode in winter, the first electromagnetic valve 13 is closed and the second electromagnetic valve 21 is opened by the ECU 27, thereby opening the bypass passage 20. As a result, high-temperature gas refrigerant discharged from the compressor 10 flows through the second electromagnetic valve 21 and the throttle 21a to be decompressed, and then flows into the evaporator 18. Gas refrigerant from the bypass passage 20 is restricted from flowing into the expansion valve 16 by the check valve 17.

The evaporator 18 radiates heat of superheated gas refrigerant toward air flowing in the case 22 to heat air. When a temperature of engine coolant is relatively high, air is further heated by the heating heat exchanger 24 into which engine coolant is introduced through the hot water valve 25. The air heated by the evaporator 18 and the heating heat exchanger 24 is blown into the passenger compartment for heating the passenger compartment. Gas refrigerant having released heat in the evaporator 18 is sucked into the compressor 10 through the separator 19 and is compressed by the compressor 10.

In the heating mode in winter, an amount of heat released from gas refrigerant flowing through the evaporator 18 corresponds to an amount of work of compression performed by the compressor 10. Therefore, when an amount of work of compression performed by the compressor 10 is increased, an amount of heat radiation of the evaporator 18 is also increased. To increase an amount of work of compression performed by the compressor 10, refrigerant staying in the condenser 14 needs to be discharged so that a sufficient amount of refrigerant circulates through the cycle during a hot-gas bypass operation in which the bypass passage 20 is opened to improve a heating performance of the air conditioner.

Refrigerant staying in the condenser 14 is forced to be discharged and introduced to the evaporator 18 as follows (hereinafter referred to as refrigerant recovery mode). When starting the hot-gas bypass operation, the electromagnetic clutch 11 is turned on for a predetermined time such as thirty seconds using a timer to start the compressor 10. At the same time, the cooling fan 14a and the blower 23 are turned off, and the first and second electromagnetic valves 13, 21 are closed. Since the first and second electromagnetic valves 13, 21 are closed, the cycle at a downstream side of the outlet of the compressor 10 is closed. As a result, a pressure of refrigerant in the cycle is decreased due to suction operation by the compressor 10, and refrigerant staying in the condenser 14 is forced to be discharged and introduced to the evaporator 18. Thus, the refrigerant recovery mode is set. The refrigerant recovery mode may be set while the first electromagnetic valve 13 is opened, that is, while setting a cooling mode in which refrigeration cycle is operated normally.

When a setting time of the refrigerant recovery mode exceeds the predetermined time such as thirty seconds, the second electromagnetic valve 21 is opened while the first electromagnetic valve 13 is kept closed. The electromagnetic clutch 11 is kept to be turned on, and the blower 23 is turned on. As a result, the heating mode is started while the bypass passage 20 is opened.

However, when the refrigerant recovery mode is set when a temperature of outside air is extremely low such as −10° C. or lower in cold districts, an opening degree of the expansion valve 16 becomes small. When the temperature of outside air is further decreased, the expansion valve 16 is closed. As a result, the expansion valve 16 restricts refrigerant staying in the condenser 14 from being introduced into the evaporator 18, and refrigerant staying in the condenser 14 is insufficiently returned to the evaporator 18.

Next, operation characteristics of the expansion valve 16 according to the first embodiment will be described with reference to FIG. 3. In FIG. 3, a temperature of the temperature detecting cylinder 171 is plotted on a horizontal axis. A cycle low pressure of refrigerant introduced into the lower room 170 of the expansion valve 16 through the outer equalizing pipe 173, that is, a pressure of refrigerant discharged from the evaporator 18, is plotted on a vertical axis.

A broken line C-1 shows a state of refrigerant discharged from an evaporator of a conventional refrigeration cycle in which a conventional thermostatic expansion valve is used. A solid line C-3 shows a state of refrigerant discharged from the evaporator 18 of the refrigeration cycle according to the first embodiment in which the expansion valve 16 is used. A one-dot-chain line C-2 shows saturation pressure characteristics of HFC134a circulating the cycle. Although not shown in FIG. 3, a pressure of refrigerant in the temperature detecting cylinder 171 is larger than a cycle low pressure by a predetermined value which corresponds to a mounting load of the coil spring 175. An arrow SD indicates a superheat degree which corresponds to a temperature difference between C-1 and C-2. The expansion valve is opened at a right side of C-1 and is closed at a left side of C-1 as indicated by arrows.

In C-1, an amount of adsorbent contained in a temperature detecting cylinder and a mounting load of a coil spring are set so that refrigerant discharged from the evaporator has a predetermined degree of superheat such as 10° C. under normal operation conditions in a cooling mode such as a cycle low pressure is set to 2–5 kg/cm$^2$G. In C-3 according to the first embodiment, the amount of the adsorbent 172 is decreased in comparison with that of C-1. For example, the amount of the adsorbent 172 in C-3 is set to 5 g while that of C-1 is 8 g.

Since an amount of the adsorbent is relatively large in C-1, when a temperature of the temperature detecting cylinder is relatively high, an amount of gas refrigerant released from the adsorbent is increased, thereby increasing a pressure of refrigerant in the temperature detecting cylinder. As a result, an opening degree of the expansion valve is increased and a cycle low pressure is increased. However, when a temperature of the temperature detecting cylinder is relatively low, an amount of gas refrigerant adsorbed by the adsorbent is increased, thereby decreasing a pressure of refrigerant in the temperature detecting cylinder. As a result, an opening degree of the expansion valve is decreased and a cycle low pressure is decreased.

In C-3 according to the first embodiment, the amount of the adsorbent 172 is smaller than that in C-1. Therefore, when a temperature of the temperature detecting cylinder 171 is relatively high, an amount of gas refrigerant released from the adsorbent 172 is smaller than that of C-1, thereby decreasing an increasing rate of a pressure of refrigerant in the temperature detecting cylinder 171. As a result, an increasing rate of an opening degree of the expansion valve 16 is decreased and an increasing rate of a cycle low pressure is decreased. When a temperature of the temperature detecting cylinder 171 is relatively low, an amount of gas refrigerant adsorbed by the adsorbent 172 becomes smaller than that in C-1, and a decreasing rate of a pressure of refrigerant in the temperature detecting cylinder 171 is decreased. As a result, a decreasing rate of an opening degree of the expansion valve 16 is decreased, and a decreasing rate of a cycle low pressure is decreased. Thus, in C-3, a change rate of a pressure of refrigerant in the temperature detecting cylinder 171 relative to a temperature of the temperature detecting cylinder 171 is smaller than that in C-1. That is, C-3 is more inclined downwardly than C-1 in FIG. 3.

In C-1, when a temperature of the temperature detecting cylinder is decreased to −22.5° C., a cycle low pressure becomes −1 kg/cm$^2$G. As a result, the expansion valve remains to be closed due to a low pressure of refrigerant in the temperature detecting cylinder. Therefore, refrigerant staying in a condenser can not be returned to the evaporator.

In C-3 according to the first embodiment, the amount of the adsorbent 172 is decreased so that a change rate of a pressure of refrigerant in the temperature detecting cylinder 171 relative to a temperature of the temperature detecting cylinder 172 is decreased. Therefore, a pressure of refrigerant in the temperature detecting cylinder 171 is maintained to a value which enables the expansion valve 16 to be opened until a temperature of the temperature detecting cylinder 171 becomes lower than −35° C. Therefore, in the first embodiment, refrigerant staying in the condenser 14 is surely discharged and introduced to the evaporator 18, and the air conditioner provides a sufficient heating performance in the heating mode while the bypass passage 20 is opened.

When the bypass passage 20 is kept to be opened for a relatively long period of time such as one hour or longer, refrigerant may be accumulated in the condenser 14 due to leakage of refrigerant at the electromagnetic valve 13 and the check valve 17. Therefore, the refrigerant recovery mode may be set not only when starting the hot-gas bypass operation, but also when a predetermined period of time such as one hour has passed since the hot-gas bypass operation has been started.

(Second Embodiment)

A second preferred embodiment of the present invention will be described with reference to FIGS. 4 and 5. In this and following embodiments, components which are substantially the same as those in previous embodiments are assigned the same reference numerals.

Figure 4:
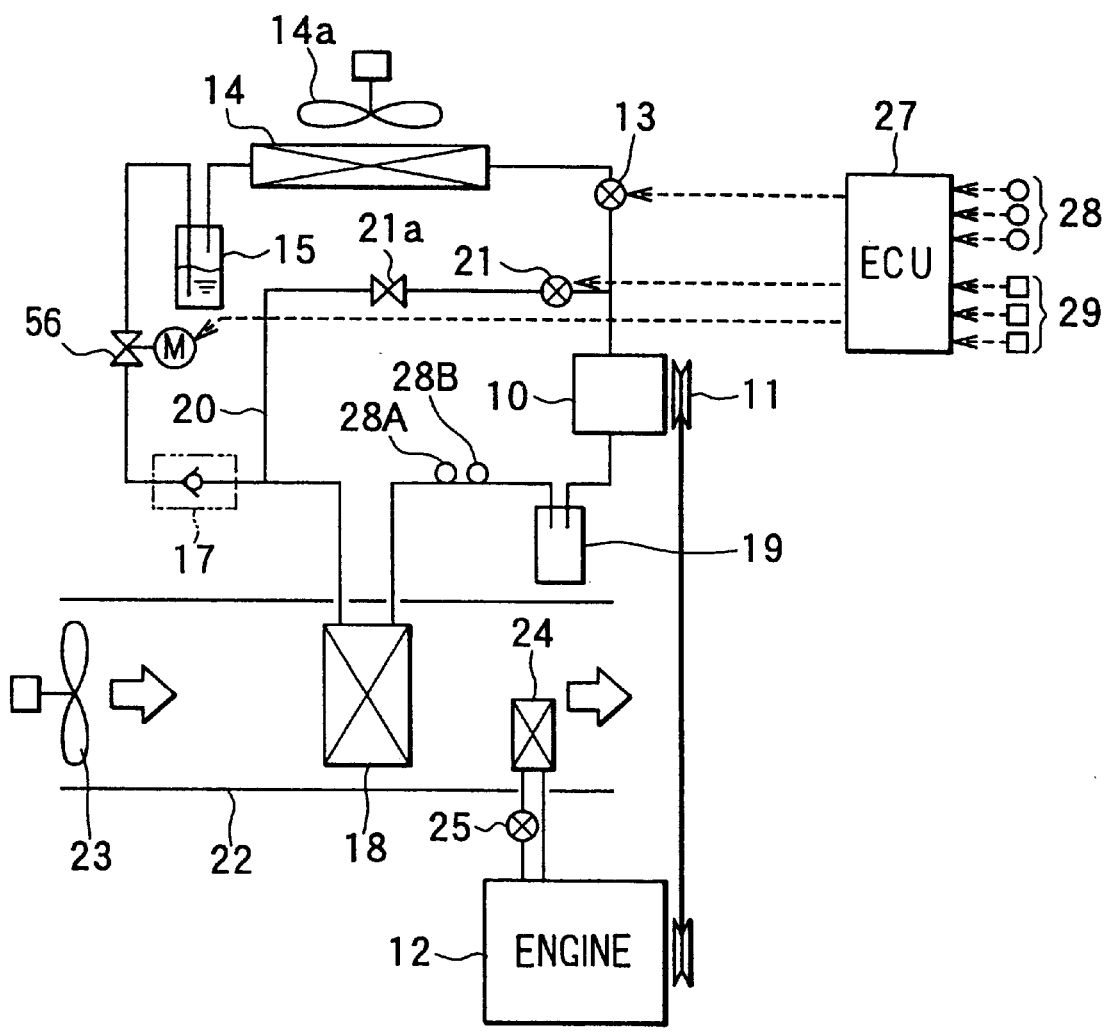
FIG. 4 is a schematic diagram showing a refrigeration cycle for a vehicle air conditioner according to a second preferred embodiment of the present invention.

In the second embodiment, as shown in FIG. 4, an electric expansion valve 56 which adjusts an opening degree thereof electrically is used as a cooling decompressing unit instead of the expansion valve 16. The expansion valve 56 is controlled to be opened as the refrigerant recovery mode is set. The refrigerant recovery mode is set for a predetermined period of time after the heating mode is set with the bypass passage 20 being opened or the like. To control the expansion valve 56, a temperature sensor 28a and a pressure sensor 28b are disposed in the vicinity of the outlet of the evaporator 18. A temperature of refrigerant discharged from the evaporator 18 detected by the temperature sensor 28a and a pressure of refrigerant discharged from the evaporator 18 detected by the pressure sensor 28b are input into the ECU 27.

Figure 5:
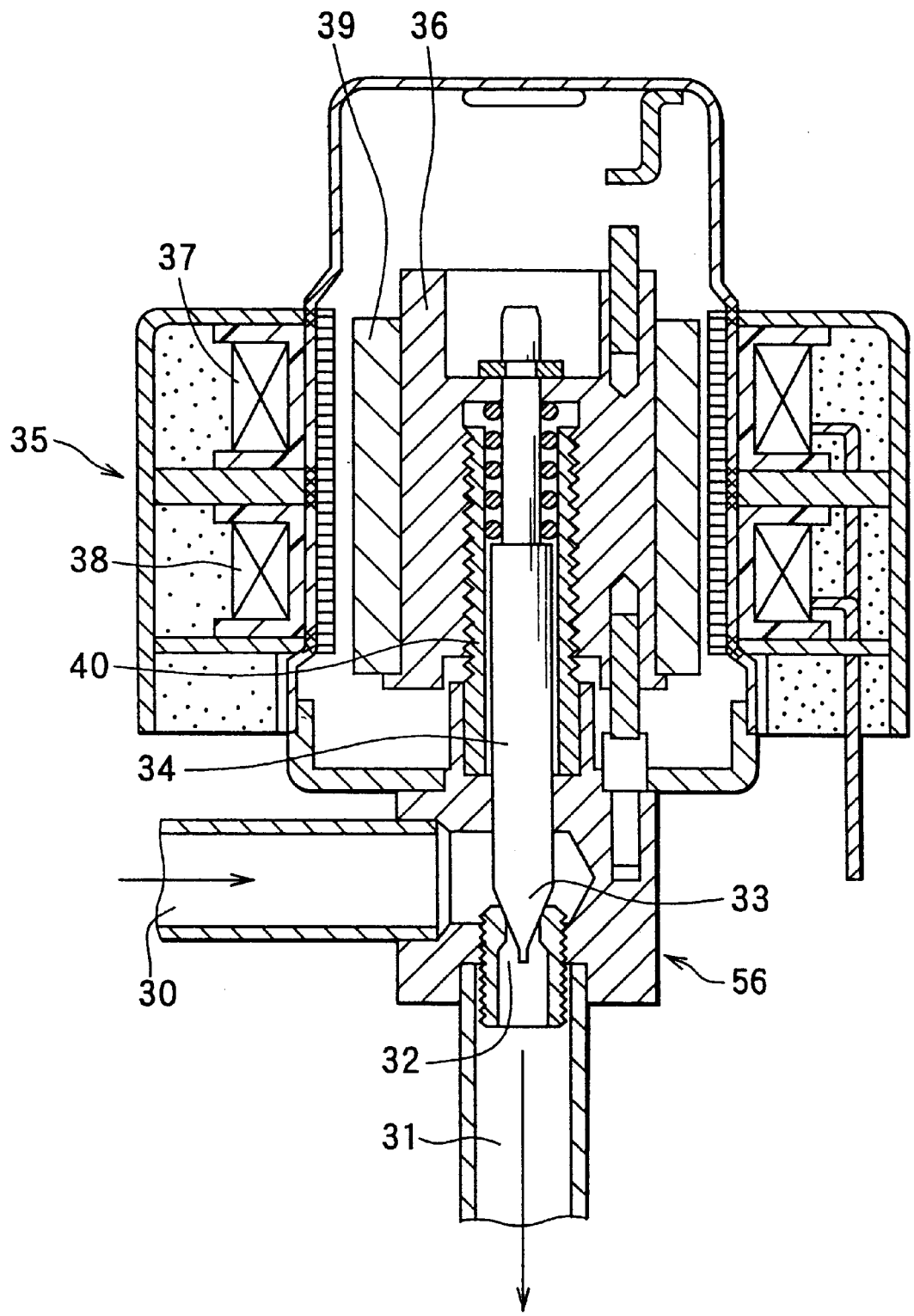
FIG. 5 is a sectional view showing an electric expansion valve according to the second embodiment.

As shown in FIG. 5, the expansion valve 56 has an inlet 30 through which refrigerant from the separator 15 is introduced and an outlet 31 through which refrigerant is discharged toward the evaporator 18. The expansion valve 56 also has a throttle passage 32 extending between the inlet 30 and the outlet 31. An opening degree of the throttle passage 32 is adjusted by a valve body 33. The valve body 33 is formed integrally with an operation axis 34. The valve body 33 and the operation axis 34 are driven by a rotor 36 of a step motor 35.

The step motor 35 has exciting coils 37, 38. The rotor 36 generates torque due to magnetic attraction or repulsion between a magnetic pole generated by the exciting coils 37, 38 and a magnetic pole (i.e., north pole or south pole) polarized on a permanent magnet 39 of the rotor 36. The torque of the rotor 36 is converted into displacement in an axial direction of the rotor 36 through thread engagement between the rotor 36 and a fixed holding member 40. Therefore, the valve body 33 is displaced in an axial direction thereof through the operation axis 34, and an opening degree of the throttle passage 32 is adjusted by the valve body 33. An amount of displacement of the valve body 33 in an axial direction of thereof, that is, an opening degree of the throttle passage 32, is determined by an input pulse number applied to the exciting coils 37, 38.

According to the second embodiment, when the refrigerant recovery mode is set, a predetermined input pulse number is applied to the exciting coils 37, 38, thereby opening the expansion valve 56. Therefore, even when a temperature of outside air is extremely low so that the expansion valve 16 is closed, refrigerant staying in the condenser 14 is securely returned to the evaporator 18 through the expansion valve 56.

(Third Embodiment)

Figure 6:
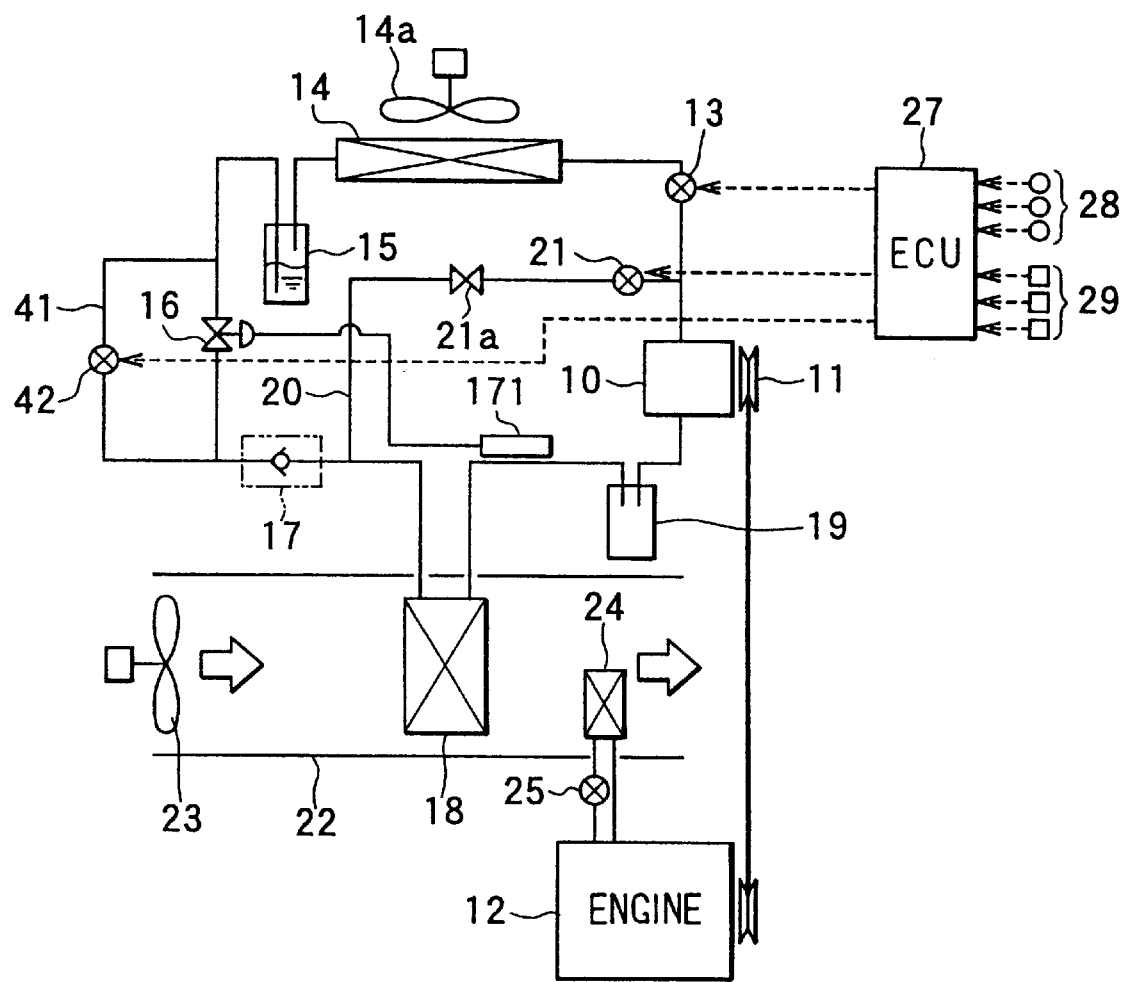
FIG. 6 is a schematic diagram showing a refrigeration cycle for a vehicle air conditioner according to a third preferred embodiment of the present invention.

A third preferred embodiment of the present invention will be described with reference to FIG. 6. In the third embodiment, a bypass passage 41 is disposed in parallel with the expansion valve 16. An electromagnetic valve 42 is disposed in the bypass passage 41. When the refrigerant recovery mode is set, for example, for a predetermined period of time after starting the heating mode with the bypass passage 20 being opened, the electromagnetic valve 42 is controlled to be opened. As a result, even when a temperature of outside air is extremely low and the expansion valve 16 is closed, refrigerant staying in the condenser 14 is securely returned to the evaporator 18 through the bypass passage 41.

(Fourth Embodiment)

Figure 7:
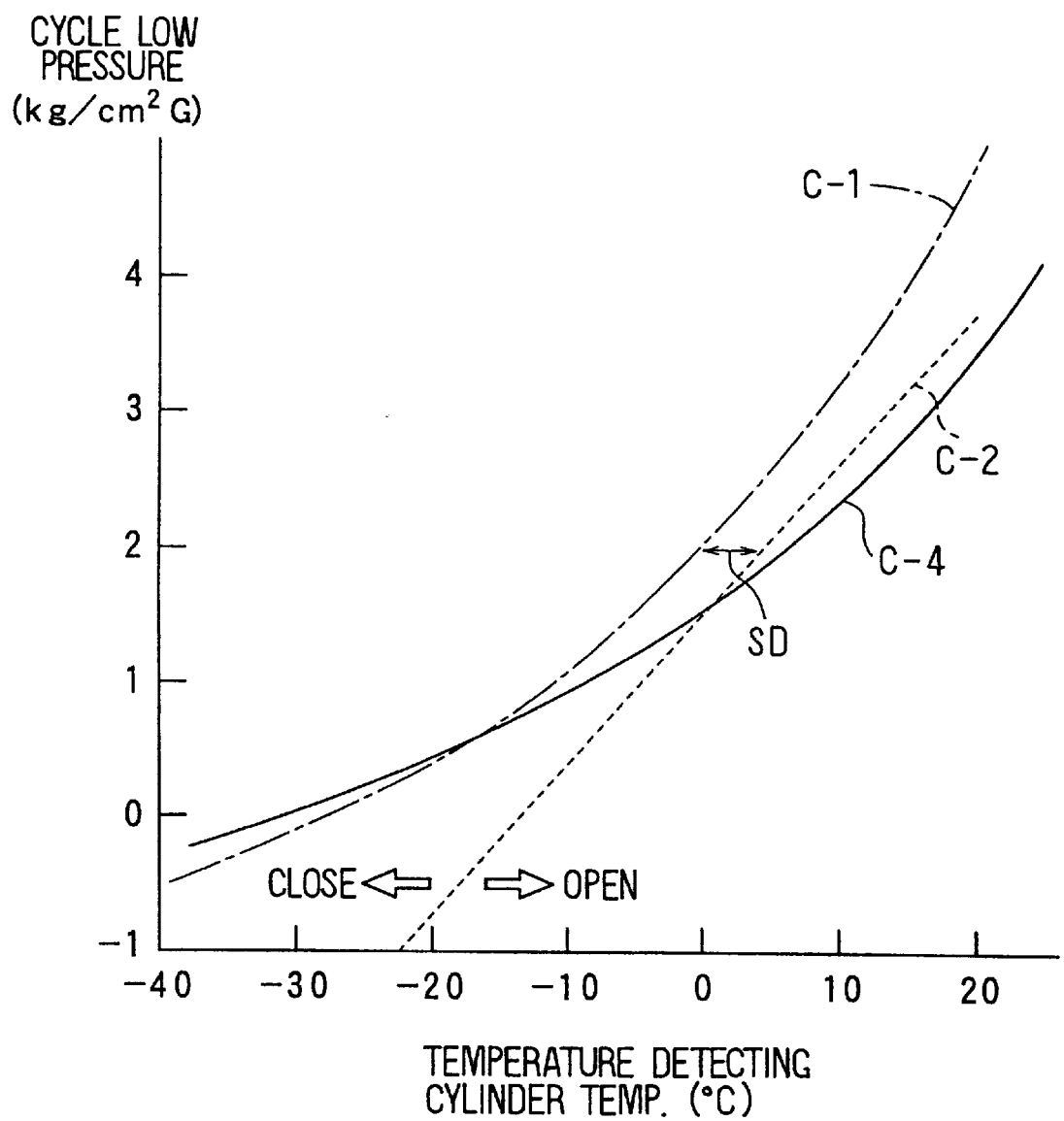
FIG. 7 is a graph showing a relationship between a temperature of a temperature detecting cylinder and a cycle low pressure of a refrigeration cycle according to a fourth preferred embodiment of the present invention.

A fourth preferred embodiment of the present invention will be described with reference to FIG. 7. In the fourth embodiment, the temperature detecting cylinder 171 is filled with a gas-liquid two-phase refrigerant which is different from HFC134a. Characteristics of the fourth embodiment are shown by a solid line C-4 in FIG. 7. The refrigerant contained in the temperature detecting cylinder 171 has a smaller change rate of a saturation pressure thereof relative to temperature than that of HFC134a, at least when a temperature of the temperature detecting cylinder 171 is in a range of low temperature, that is, lower than 0° C. in FIG. 7.

In the fourth embodiment, the adsorbent 172 is omitted, and the temperature detecting cylinder 171 is filled with a gas mixture of HCFC124 and nitrogen ($N_2$) gas instead. Gas-liquid two-phase HCFC124 is contained in the temperature detecting cylinder 171 and determines changing characteristics of a saturation pressure of the gas mixture in the temperature detecting cylinder 171. $N_2$ gas is constantly kept in a gas phase in the temperature detecting cylinder 171, and increases a pressure of the gas mixture in the temperature detecting cylinder 171.

According to the fourth embodiment, the gas mixture of HCFC124 and $N_2$ gas contained in the temperature detecting cylinder 171 has a smaller change rate of a saturation pressure thereof relative to temperature than that of HFC134a, when a temperature of the temperature detecting cylinder 171 is relatively low. Therefore, as shown in FIG. 7, even when a temperature of the temperature detecting cylinder 171 is in the vicinity of −30° C., a cycle low pressure is sufficiently higher than that of C-1, in the vicinity of 0 $kg/cm^2G$. Therefore, a pressure of refrigerant in the temperature detecting cylinder 171 is maintained to a value which enables the expansion valve 16 to be opened, and refrigerant staying in the condenser 14 is securely returned to the evaporator 18.

The first and second electromagnetic valves 13, 20 may be formed integrally into a single valve unit which switches plural passages. The present invention is not limited to a refrigeration cycle for a vehicle air conditioner, but may be applied to any refrigeration cycle of various usage.

Although the present invention has been fully described in connection with preferred embodiments thereof with reference to the accompanying drawings, it is to be noted that various changes and modifications will become apparent to those skilled in the art. Such changes and modifications are to be understood as being within the scope of the present invention as defined by the appended claims.

What is claimed is:

1. A refrigeration cycle through which a refrigerant flows comprising:
    a compressor which compresses the refrigerant and discharges a gas refrigerant;
    a condenser which condenses the gas refrigerant discharged from the compressor;
    a decompressing unit which decompresses the refrigerant condensed by the condenser;
    an evaporator which evaporates the refrigerant decompressed by the decompressing unit; and
    a bypass passage which directly connects an outlet of the compressor to an inlet of the evaporator, the bypass passage through which the gas refrigerant discharged from the compressor is directly introduced into the evaporator in a heating mode, wherein:
        the decompressing unit is disposed in a passage between the condenser and the evaporator; and
        the decompressing unit is disposed to always open the passage between the condenser and the evaporator by a predetermined opening degree when a refrigerant recovery mode in which the refrigerant staying in the condenser is forced to be discharged and introduced into the evaporator is set even in the heating mode.

2. The refrigeration cycle according to claim 1, wherein:
    the decompressing unit is a thermostatic expansion valve including a temperature detector which detects a temperature of the refrigerant discharged from the evaporator; and
    the thermostatic expansion valve is opened until a temperature of the refrigerant discharged from the evaporator detected by the temperature detector is decreased to −30° C. and lower.

3. The refrigeration cycle according to claim 2, wherein:
    the temperature detector is filled with a gas medium and an adsorbent which adsorbs and releases the gas medium according to a temperature of the adsorbent; and
    an amount of the adsorbent contained in the temperature detector is set so that the thermostatic expansion valve is opened until a temperature of the refrigerant discharged from the evaporator detected by the temperature detector is decreased to −30° C. and lower.

4. A refrigeration cycle through which a refrigerant flows comprising:
    a compressor which compresses the refrigerant and discharges a gas refrigerant;
    a condenser which condenses the gas refrigerant discharged from the compressor;
    a decompressing unit which decompresses the refrigerant condensed by the condenser;
    an evaporator which evaporates the refrigerant decompressed by the decompressing unit; and
    a bypass passage which directly connects an outlet of the compressor to an inlet of the evaporator, the bypass passage through which the gas refrigerant discharged from the compressor is directly introduced into the evaporator in a heating mode, wherein:
        the decompressing unit is disposed in a passage between the condenser and the evaporator;
        the passage between the condenser and the evaporator is opened a predetermined amount when a refrigerant recovery mode in which the refrigerant staying in the condenser is forced to be discharged and introduced into the evaporator is set;

the decompressing unit is a thermostatic expansion valve including a temperature detector which detects a temperature of the refrigerant discharged from the evaporator;

the thermostatic expansion valve is opened until a temperature of the refrigerant discharged from the evaporator detected by the temperature detector is decreased to −30° C. and lower; and the temperature detector is filled with a gas-liquid two-phase fluid having a smaller change rate of a saturation pressure thereof relative to temperature than that of the refrigerant, so that the thermostatic expansion valve is opened until a temperature of the refrigerant discharged from the evaporator detected by the temperature detector is decreased to −30° C. and lower.

5. A refrigeration cycle through which a refrigerant flows comprising:

a compressor which compresses the refrigerant and discharges a gas refrigerant;

a condenser which condenses the gas refrigerant discharged from the compressor;

a decompressing unit which decompresses the refrigerant condensed by the condenser;

an evaporator which evaporates the refrigerant decompressed by the decompressing unit; and a bypass passage which directly connects an outlet of the compressor to an inlet of the evaporator, the bypass passage through which the gas refrigerant discharged from the compressor is directly introduced into the evaporator in a heating mode, wherein:

the decompressing unit is disposed in a passage between the condenser and the evaporator;

the passage between the condenser and the evaporator is opened a predetermined amount when a refrigerant recovery mode in which the refrigerant staying in the condenser is forced to be discharged and introduced into the evaporator is set;

the decompressing unit is a thermostatic expansion valve including a temperature detector which detects a temperature of the refrigerant discharged from the evaporator;

the thermostatic expansion valve is opened until a temperature of the refrigerant discharged from the evaporator detected by the temperature detector is decreased to −30° C. and lower; and the temperature detector is filled with a gas-liquid two-phase fluid having a smaller change rate of a saturation pressure thereof relative to temperature than that of the refrigerant when a temperature of the temperature detector is 0° C. and lower, so that the thermostatic expansion valve is opened until a temperature of the refrigerant discharged from the evaporator detected by the temperature detector is decreased to −30° C. and lower.

6. The refrigeration cycle according to claim 1, wherein:

the decompressing unit is an electrical expansion valve which electrically adjusts an opening degree thereof; and the electrical expansion valve is opened when the refrigerant recovery mode is set.

7. The refrigeration cycle according to claim 1, further comprising:

a decompressing bypass passage through which the refrigerant flows bypassing the decompressing unit; and a valve disposed in the decompressing bypass passage, the valve which opens the decompressing bypass passage when the refrigerant recovery mode is set.

8. The refrigerant cycle according to claim 1, wherein the refrigerant recovery mode is set when temperature of outside air is lower than 0° C.

9. The refrigerant cycle according to claim 1, wherein the refrigerant recovery mode is set when temperature of the refrigerant discharged from the evaporator is lower than 0° C.

10. The refrigerant cycle according to claim 1, wherein the refrigerant recovery mode is set when pressure of refrigerant in the cycle is lower than a saturation pressure of the refrigerant having a temperature of 0° C.

11. The refrigerant cycle according to claim 1, wherein the decompression unit is a thermo-expansion valve which always opens at least a part of the passage between the condenser and the evaporator.

12. The refrigerant cycle according to claim 1, further comprising:

a first valve disposed to open and close a refrigerant flow from the compressor to the condenser; and a second valve disposed in the bypass passage to open and close the bypass passage, wherein both the first and second valve are closed when the refrigerant recovery mode is set during the heating mode.

* * * * *